June 18, 1957 — L. P. BRANDEWIE — 2,795,813
FISH AND GAME HOLDING DEVICE
Filed July 9, 1954
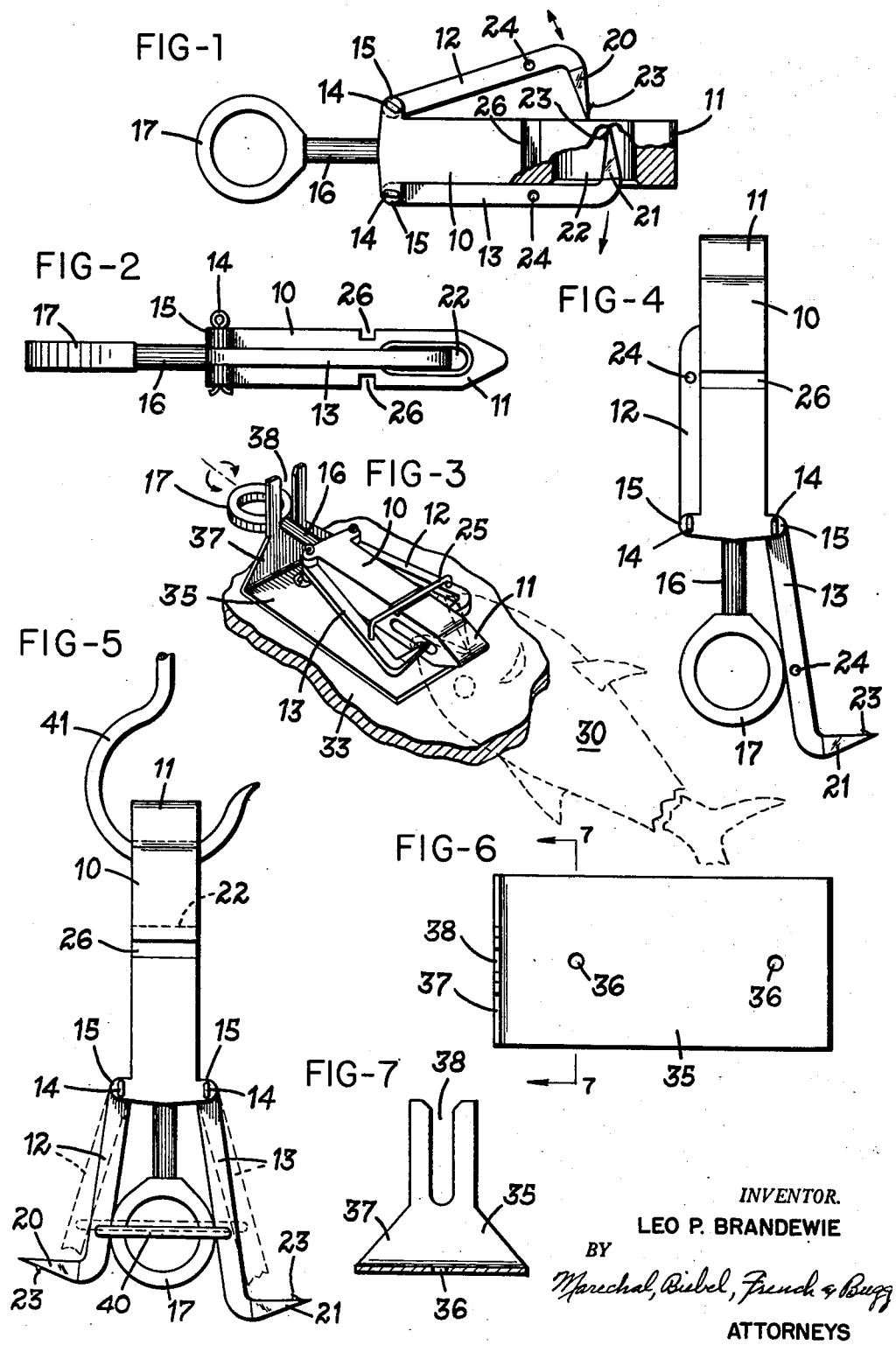
INVENTOR.
LEO P. BRANDEWIE
BY Marechal, Biebel, French & Bugg
ATTORNEYS

United States Patent Office 2,795,813
Patented June 18, 1957

2,795,813

FISH AND GAME HOLDING DEVICE

Leo P. Brandewie, Sidney, Ohio

Application July 9, 1954, Serial No. 442,268

3 Claims. (Cl. 17—8)

This invention relates to a device for holding animals such as fish and small game during skinning, cleaning and like butchering operations.

One of the primary objects of this invention is to provide such a device which is not only useful for holding an animal during butchering but which also includes parts adapted for use as a gaff during fishing.

Another object of the invention is to provide such a holding device which is applicable for use with animals of a considerable range of sizes and especially to a substantial range of sizes of fish for both gaffing and butchering purposes.

It is also an object of the invention to provide a holding device as outlined above which is of small and compact proportions readily carried in the pocket of the user and which at the same time is of such construction as to offer maximum protection both to its working parts and to the user.

Additional objects and advantages of the invention will be apparent from the following description, the accompanying drawings and the appended claims.

In the drawings—

Fig. 1 is an elevational view, partly broken away, showing a holding device constructed in accordance with the invention;

Fig. 2 is an elevational view looking at right angles to Fig. 1;

Fig. 3 shows the device of Figs. 1 and 2 in operative position holding a fish for butchering;

Fig 4 illustrates the position of the device for use as a gaff;

Fig. 5 shows another mode of use of the device, as a hanger for a land animal; and Figs. 6 and 7 show a bracket adapted for use with the holding device, Fig. 7 being a section on the line 7—7 of Fig. 6.

Referring to the drawing, which illustrates a preferred embodiment of the invention, the main body 10 of the holding device is elongated, having opposed sides and faces, and includes a tongue 11 which is relatively flat for insertion in the mouth of a fish to be held. At the opposite end of the body 10 from the tongue 11 is a pair of arms 12 and 13, which are pivoted to the body by suitable pins 14 in forked extensions 15 on either side of the body. An extension 16 at this end of the body 10 terminates in a ring 17 which is shown as of somewhat greater diameter than the width of the body 10 across its forked portions 15.

Each of the arms 12 and 13 terminates in a hook 20, 21 facing the tongue 11, and a passage 22 is provided through the tongue 11 from side to side thereof for receiving these hooks 20 and 21 therein in the folded positions of the arms. The arms are of different lengths to provide for overlapping of the hooks 20 and 21 in the passage 22, and if desired, each hook may be provided with one or more barbs 23 as shown. In addition, each arm is provided with a through bore 24 for receiving the end of a U-shaped spring wire clip 25, and the tongue 11 has a slot 26 in one or both faces thereof to receive the central portion of this clip.

In the use of this device for butchering a fish, the end of the tongue 11 is inserted in the mouth of the fish as indicated in conjunction with the fish shown diagrammatically at 30 in Fig. 3. The arms 12 and 13 are then pressed into the lips or jaws of the fish to drive their hook portions into retaining engagement with the fish. In order to prevent accidental dislodging of the hooks, the wire clip 25 is fitted into place as shown in Fig. 3, with its ends in the two bores 24 in the arms. Under many conditions, the hooks will remain in place frictionally without requiring clip 25, and it is also possible to tie them in place by a string or the like threaded through bores 24.

After the device has been mounted in the head of the fish, it may be used as a hanger by means of the ring 17, or it can be used to hold the fish on a sink or table 33 for cleaning. Figs. 6 and 7 illustrate a bracket 35 adapted for bolting through the holes 36 to such butchering table and terminating at one end in a right angled portion 37 provided with a slot 38 for receiving the shank portion of the extension 16 on the body 10. The use of this bracket is also illustrated in Fig. 3, and it will be apparent that the animal can be rolled from side to side as desired by pivoting the extension 16 in the slot 38.

As stated, this holding device is usable for gaffing fish, and Fig. 4 shows its use for such purposes. One of the arms 12 or 13, shown as the arm 13, is pivoted outwardly until it rests on the ring 17, which ring then functions as an abutment stop for arm 13, while the other arm 12 remains with its hook portion 20 received within the passage 22 in the tongue 11. The fisherman can then use the tongue as a handle for the device while using the hook 21 on the arm 13 as a gaff in the usual way, and during such use of the device, the hook 20 remains in passage 22 in protected relation with respect both to itself and to the user.

This device can be used as a hanger for use in butchering land animals, including both small mammals and birds and also large animals such as deer and the like. For such uses with small animals such as rabbits, pheasant and the like, and referring to Fig. 5, the arms 12 and 13 are both swung outwardly from the tongue 11 through approximately 180° so that their respective hook portions face in opposite directions. The hook portions 20 and 21 are then inserted in the hocks of the mammal or the hocks or feet of the bird, the arms 12 and 13 are then braced apart by means of a suitable stiff wire 40 inserted in the two bores 24 as shown in Fig 5, the length of this wire being greater than that of the wire clip 25 and readily changed in accordance with the desired spacing of the hooks in the position shown in Fig. 5. The passage 22 will then serve to receive a cord, wire or hook for hanging as indicated at 41 in Fig. 5.

In the use of the invention for butchering a larger animal such as a deer, it is preferable to use two of these devices. A simple manner of such use is to slit the back of the ankle on each rear leg of the deer, and then to insert the tongue portion of the device and engage the hooks with the tendons and with the aid of the wire clip 25 as described. The two units will then form convenient means for raising and hanging the animal by its two hind legs for ready butchering. Satisfactory results for all the above uses have been obtained with a single size of the device of an overall length of between five and six inches and the proportions illustrated in the drawing.

While the form of device herein described constitutes a preferred embodiment of the invention, it is to be under-

What is claimed is:

1. A device of the character described, comprising an elongated body having opposite sides and faces and including a tongue at one end thereof adapted to be inserted in a cavity in an animal corpse, a pair of arms having pivoted mountings on opposite sides of the other end of said body opposite said tongue providing for swinging movement of said arms toward and away from said tongue, said tongue having a passage therethrough extending from one side to the other thereof, a hook on the free end of each of said arms facing said tongue for engagement with the flesh of the animal between each said hook and said tongue to hold the animal during butchering and like operations, said hooks being receivable in protecting relation in said passage in the rest position of said device, an extension on the opposite end of said body from said tongue, means on said extension forming a handle for mounting said device following securing thereof to the animal, said pivoted mountings being located for swinging movement of both said arms away from said tongue to positions approximately in line with said body and with said hooks projecting outwardly from the sides thereof, and said extension including a portion forming an abutment stop limiting swinging movement of one of said arms providing for use of the device as a gaff with the other arm having its hook received in said passage and said other arm cooperating with said body to provide a handle during gaffing.

2. A device as set forth in claim 1 including means for retaining both of said hooks in predetermined spaced relation with respect to said tongue to prevent release of said hooks from the flesh of the animal during butchering and like operations.

3. A device as set forth in claim 1 including means for retaining both of said arms in position extending approximately in line with said body and with said hooks projecting in opposite directions to provide for securing said hooks to the legs of an animal, said passage being adapted to receive a hanger with both said arms so extended.

References Cited in the file of this patent

UNITED STATES PATENTS

| 590,401 | Morgan | Sept. 21, 1897 |
| 1,530,675 | Janes | Mar. 24, 1925 |
| 2,015,262 | Flagg et al. | Sept. 24, 1935 |
| 2,603,829 | Siskoff | July 22, 1952 |

FOREIGN PATENTS

| 26,481 | Great Britain | 1904 |
| 236,106 | Germany | June 30, 1911 |